(12) United States Patent
Enokijima

(10) Patent No.: US 9,694,720 B2
(45) Date of Patent: Jul. 4, 2017

(54) RECLINING DEVICE

(71) Applicant: SHIROKI CORPORATION, Fujisawa (JP)

(72) Inventor: Tomohiro Enokijima, Fujisawa (JP)

(73) Assignee: SHIROKI CORPORATION, Fujisawa-Shi, Kanagawa (JP)

(*) Notice: Subject to any disclaimer, the term of this patent is extended or adjusted under 35 U.S.C. 154(b) by 159 days.

(21) Appl. No.: 14/436,462

(22) PCT Filed: Oct. 11, 2013

(86) PCT No.: PCT/JP2013/077823
§ 371 (c)(1),
(2) Date: Apr. 16, 2015

(87) PCT Pub. No.: WO2014/065139
PCT Pub. Date: May 1, 2014

(65) Prior Publication Data
US 2015/0291063 A1    Oct. 15, 2015

(30) Foreign Application Priority Data
Oct. 24, 2012 (JP) ................................. 2012-234428

(51) Int. Cl.
*B60N 2/225* (2006.01)
*A47C 1/025* (2006.01)

(52) U.S. Cl.
CPC ............ *B60N 2/2252* (2013.01); *A47C 1/025* (2013.01); *B60N 2/2254* (2013.01)

(58) Field of Classification Search
CPC ...... B60N 2/2252; B60N 2/2254; A47C 1/025

USPC ........................................................ 297/362
See application file for complete search history.

(56) References Cited

U.S. PATENT DOCUMENTS

| 2005/0110322 A1* | 5/2005 | Cha .................. B60N 2/2254 297/362 |
| 2008/0061616 A1 | 3/2008 | Wahls et al. |
| 2010/0194163 A1* | 8/2010 | Cha .................. B60N 2/0232 297/362 |

FOREIGN PATENT DOCUMENTS

JP    2012-056530 A    3/2012

OTHER PUBLICATIONS

International Search Report (ISR) (PCT Form PCT/ISA/210), in PCT/JP2013/077823, dated Dec. 24, 2013.

* cited by examiner

*Primary Examiner* — Milton Nelson, Jr.
(74) *Attorney, Agent, or Firm* — McGinn IP Law Group, PLLC

(57) ABSTRACT

The present invention relates to a Taumel-type reclining device and provides a reclining device in which clattering does not occur. On either the inner side or the outer side of a first wedge-shaped member 71 and a second wedge-shaped member 73, a driving ring 75 is disposed. A abutting portion of the driving ring 75 is formed such that, in a case where the internal gear 61 and the external gear 63 are in a locked state, a force to move the first wedge-shaped member 71 and the second wedge-shaped member 73 in a direction in which engagement of the inner teeth 61c of the internal gear 61 and the outer teeth 63a of the external gear 63 becomes deeper can be generated.

3 Claims, 7 Drawing Sheets

FIG.10    -BACKGROUND ART-

RECLINING DEVICE

TECHNICAL FIELD

The present invention relates to a Taumel-type reclining device which changes the tilting angle of a seat back with respect to a seat cushion.

BACKGROUND ART

In a Taumel-type reclining device, on any one side of the seat cushion side and the seat back side, an internal gear is provided, and on the other side of the seat cushion side and the seat back side, an external gear having a smaller number of teeth than the number of teeth of the internal gear is provided so as to be engaged with the internal gear. The Taumel-type reclining device eccentrically moves one of the internal gear and the external gear around the rotation axis of the other gear while changing the engagement position of the internal gear and the external gear, thereby changing the tilting angle of the seat back with respect to the seat cushion.

FIG. 10 is a view for explaining the Taumel-type reclining device according to the related art. As shown in FIG. 10, in an eccentric annular space between the inner surface of a circular hole 1 and the outer surface of a cylinder 3, a pair of wedge-shaped members 5 and 7 is disposed. The pair of wedge-shaped members 5 and 7 is biased in directions (an arrow A direction and an arrow B direction) to drive wedges into the eccentric annular space by a spring 9.

The wedge-shaped members 5 and 7 each press the inner surface of the circular hole 1 and the outer surface of the cylinder 3, thereby pressing the internal gear and the external gear in a direction to increase eccentricity between the rotation axes of them. As a result, the inner teeth of the internal gear and the outer teeth of the external gear are deeply engaged with each other, whereby the seat back becomes a locked state in which the seat back does not tilt.

An abutting surface 11a of an unlocking cam 11 can press an end surface 5a or an end surface 7a of the tip side of the wedge-shaped member 5 or 7 against the biasing force of the spring 9, thereby pressing the wedge-shaped member 5 or the wedge-shaped member 7 in a wedge-shaped member drawing direction (the direction opposite to the driving direction: the direction opposite to the arrow A or B direction). If the wedge-shaped member 5 or the wedge-shaped member 7 are pressed to move by the unlocking cam 11, the pressing force which the wedge-shaped member 5 or the wedge-shaped member 7 applies to the inner surface of the circular hole 1 of and the outer surface of the cylinder 3 decreases, and the engagement of the inner teeth and the outer teeth becomes shallow, whereby the seat back becomes capable of tilting.

When one wedge-shaped member 5 or wedge-shaped member 7 starts moving, the other wedge-shaped member 7 or wedge-shaped member 5 is still due to friction with the inner surface of the circular hole 1 and the outer surface of the cylinder 3. However, if one wedge-shaped member moves in the wedge-shaped member drawing direction, the other wedge-shaped member quickly moves in a direction to drive the wedge into the eccentric annular space by the elastic repulsion force of the spring 9. While this operation is being repeated, eccentricity between the internal gear and the external gear is maintained, and the engagement portion varies, whereby the seat back tilts. That is, the seat back becomes an unlocked state (see Patent Literature 1 for instance).

CITATION LIST

Patent Literature

Patent Literature 1: Japanese Patent Application Laid-Open No. 2012-056530

SUMMARY OF THE INVENTION

Technical Problem

However, in the locked state of the reclining device having the configuration shown in FIG. 10, there is a case where, due to the load of the seat back or the load of a seated person on the seat back, the wedge-shaped member 5 or the wedge-shaped member 7 is strongly held by the inner surface of the circular hole 1 and the outer surface of the cylinder 3 and then the wedge-shaped member 5 or the wedge-shaped member 7 moves in the drawing direction. Then, there is a problem in which the engagement of the inner teeth and the outer teeth becomes shallow and clattering occurs at the seat back.

Therefore, an object of the present invention is to provide a reclining device in which clattering is difficult to occur.

Solution to Problem

According to an aspect of the present invention, it is provided a reclining device including: an external gear that has outer teeth formed at an outer surface and is provided on a member of one of a seat cushion side and a seat back side; an internal gear that has inner teeth engaged with the outer teeth of the external gear and have a larger number of teeth than the outer teeth and is provided on a member of the other of the seat cushion side and the seat back side; a cylindrical portion that has one of a rotation axis of the external gear and a rotation axis of the internal gear as a center and is provided at one of the external gear and the internal gear; a circular hole portion that has the other of the rotation axis of the external gear and the rotation axis of the internal gear as a center and is provided at the other of the external gear and the internal gear and that forms an annular space between the circular hole portion and the cylindrical portion; a first wedge-shaped member and a second wedge-shaped member that have substantially arc-shapes and have shapes tapered toward wedge driving directions and that are provided so as to be movable along a circumferential direction in the annular space; a pressing member that is able to press the first wedge-shaped member and the second wedge-shaped member in a direction in which the inner teeth of the internal gear and the outer teeth of the external gear are engaged, thereby forming a locked state; and a driving ring that is provided to be movable between the inner surface of the circular hole portion and the outer surface of the cylindrical portion and has an abutting portion which abuts on the first wedge-shaped member and the second wedge-shaped member, wherein the abutting portion of the driving ring is formed to be able to generate a force to move the first wedge-shaped member and the second wedge-shaped member in a direction, in which engagement of the inner teeth of the internal gear and the outer teeth of the external gear becomes deeper, when the internal gear and the external gear are in the locked state.

Other features of the present invention will become more apparent from the accompanying drawings and embodiments for practicing the invention to be described below.

Advantageous Effect of the Invention

According to the present invention, a reclining device in which clattering is difficult to occur at a seat back is provided.

Other advantages of the present invention will become more apparent from the accompanying drawings and embodiments for practicing the invention to be described below.

BRIEF DESCRIPTION OF THE DRAWINGS

FIG. 10 is a view illustrating a reclining device of the related art.

DESCRIPTION OF THE EMBODIMENT

Figure 9:
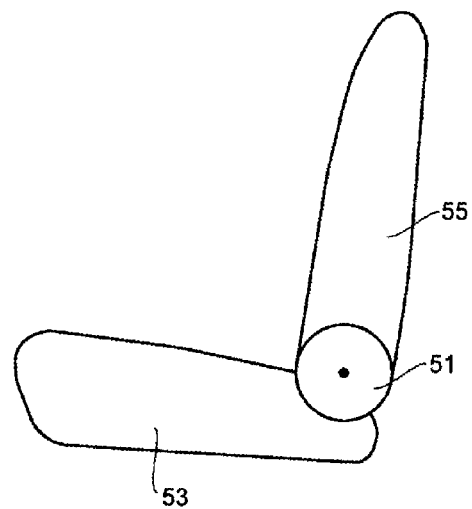
FIG. 9 is a side view of main portions of a seat equipped with the reclining device of the embodiment.
Figure 9:
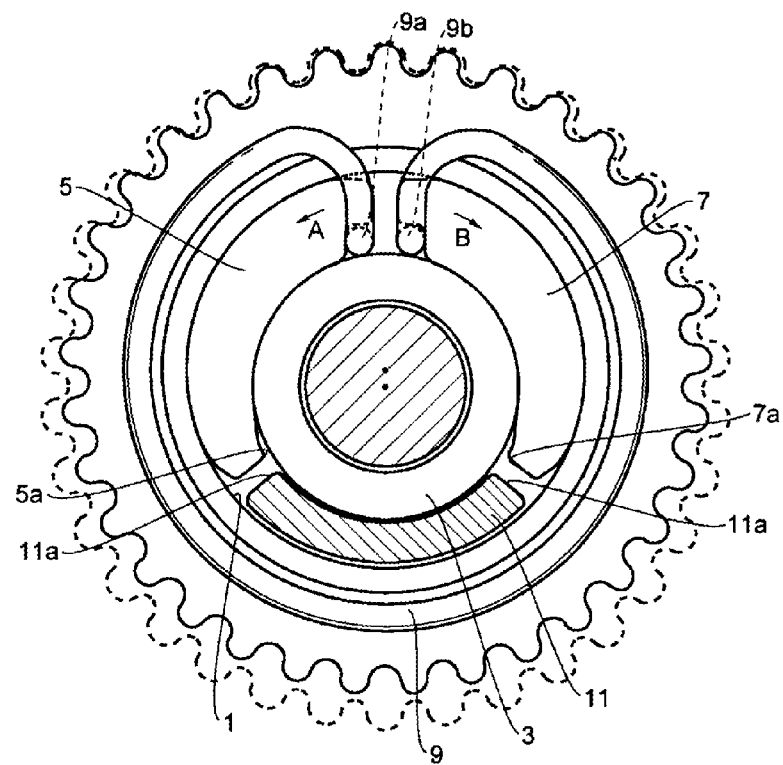

First, a seat equipped with a reclining device of an embodiment will be described using FIG. 9. FIG. 9 is a side view of main portions of the seat equipped with the reclining device of the embodiment.

As shown in the figure, a reclining device 51 is provided between a seat cushion 53 and a seat back 55.

Figure 1:
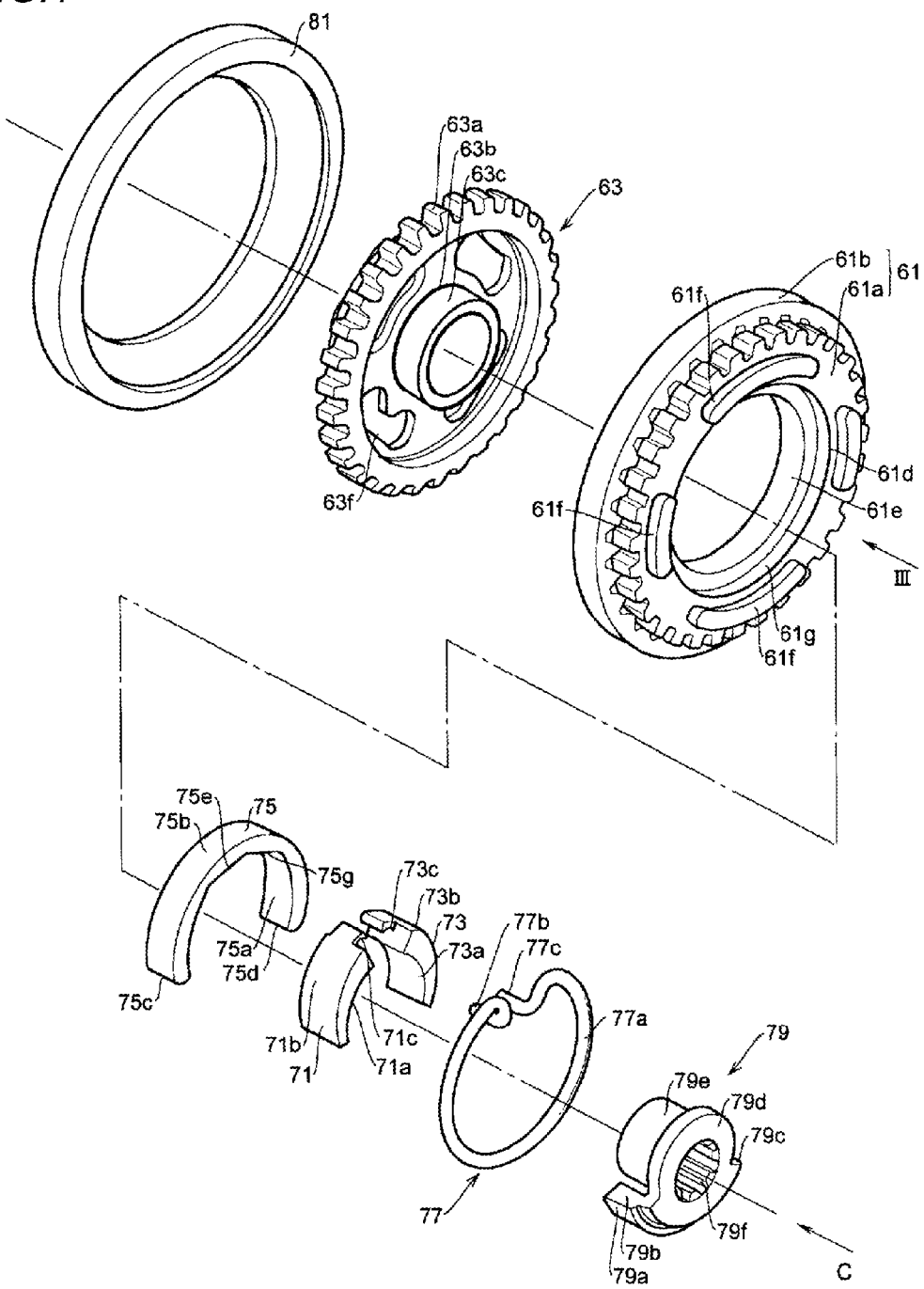
FIG. 1 is an exploded perspective view of a reclining device of an embodiment.
Figure 2:
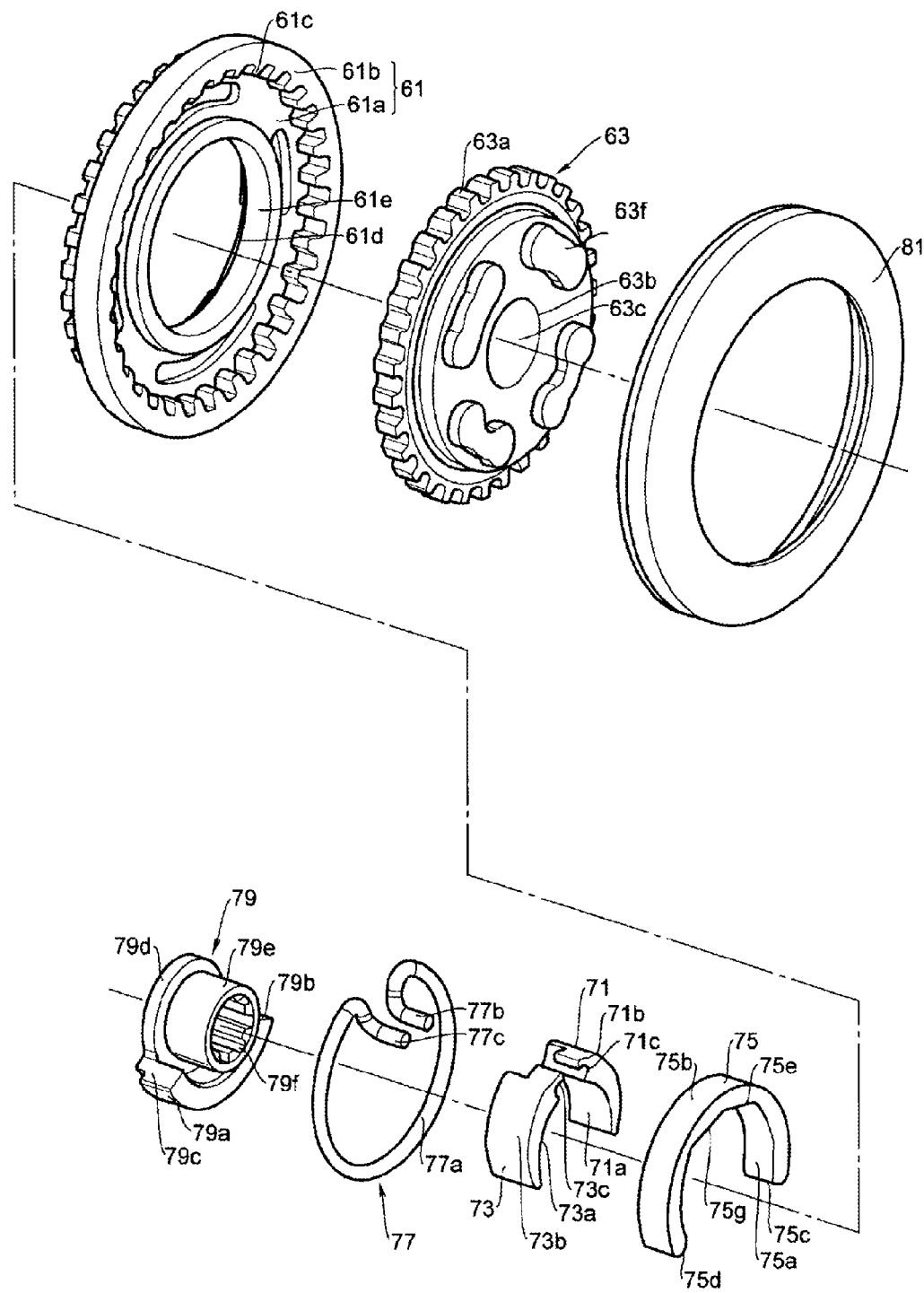
FIG. 2 is an exploded perspective view as the reclining device of FIG. 1 is seen from the opposite direction.
Figure 3:
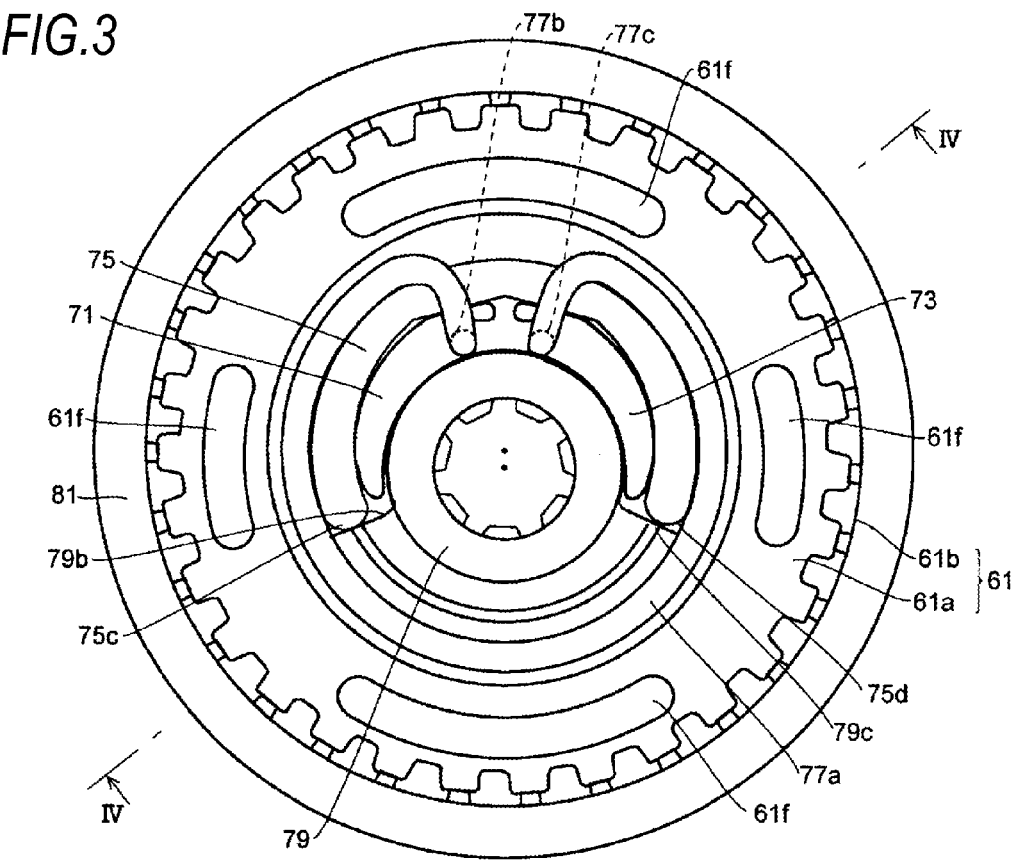
FIG. 3 is a front view as the assembled reclining device of FIG. 1 is seen from an arrow III direction.
Figure 4:
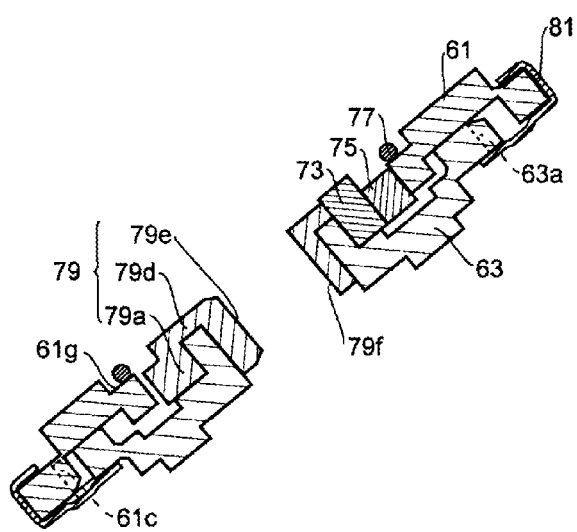
FIG. 4 is an end view along a section line IV-IV of FIG. 3.
Figure 5:
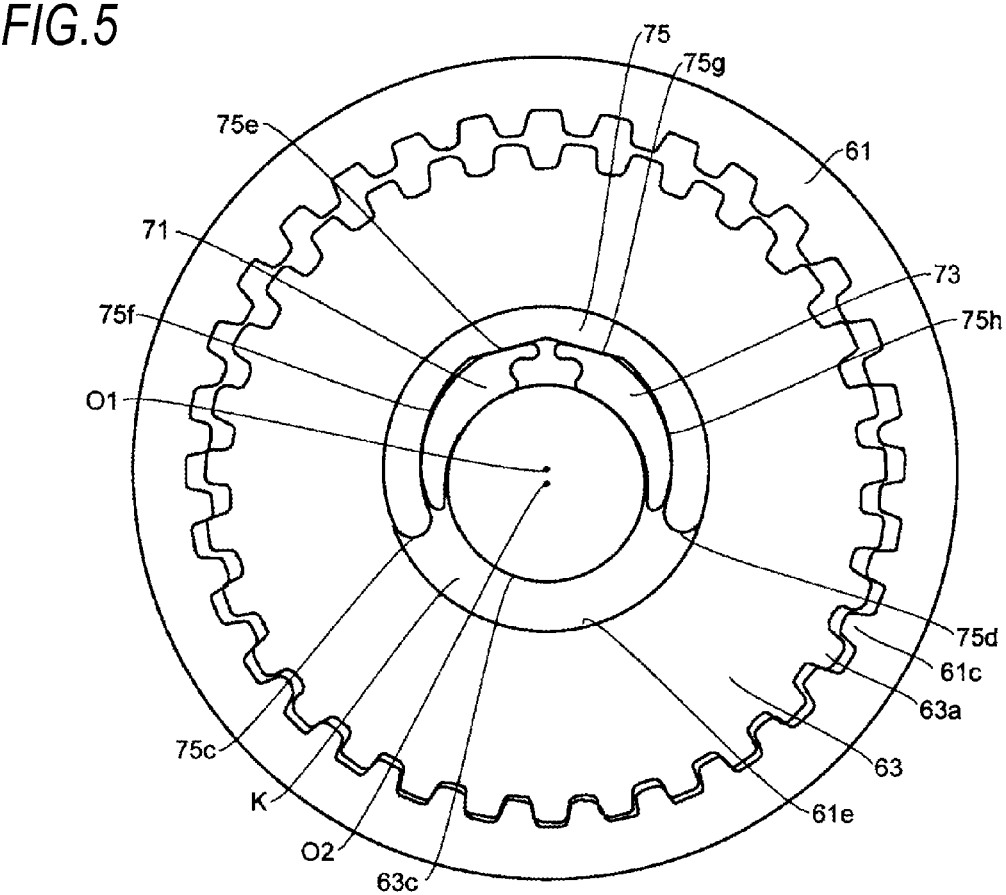
FIG. 5 is a view illustrating the locked state of a locking device shown in FIG. 1.

Next, the reclining device 51 will be described using FIGS. 1 to 5. FIG. 1 is an exploded perspective view of the reclining device of the embodiment. FIG. 2 is an exploded perspective view as the reclining device of FIG. 1 is seen from the opposite direction. FIG. 3 is a front view as the assembled reclining device of FIG. 1 is seen from an arrow III direction. FIG. 4 is an end view along a section line IV-IV of FIG. 3. FIG. 5 is a view illustrating the locked state of a locking device shown in FIG. 1.

In FIGS. 1 and 2, an internal gear 61 has a circular bottom 61a and a cylindrical rising wall portion 61b formed along the circumferential portion of the bottom 61a. The internal gear 61 is formed substantially in a bottomed cylindrical shape whose one side is an opened side. At the inner circumferential surface of the rising wall portion 61b, inner teeth 61c are formed over the entire area in the circumferential direction. Also, at the center of the bottom 61a of the internal gear 61, a through-hole 61d is formed. Along the inner circumferential surface of the hole 61d, a cylindrical rising wall portion 61e is formed so as to protrude toward the opened side. Inside this cylindrical rising wall portion 61e, a circular hole portion is formed.

At the outer surface of the bottom 61a of the internal gear 61, four arc-shaped convex portions 61f are formed. The convex portions 61f are fit into four arc-shaped holes formed in a frame of the seat cushion 53. These fitting portions are fixed by a method such as welding or caulking, whereby the internal gear 61 is attached to the seat cushion 53.

Inside the internal gear 61 having a bottomed cylindrical shape, an external gear 63 is disposed. At the outer surface of the external gear 63, outer teeth 63a are formed over the entire area in the circumferential direction. The outer teeth 63a of the external gear 63 can be engaged with the inner teeth 61c of the internal gear 61. The number of the outer teeth 63a of the external gear 63 is set to be smaller than the number of the inner teeth 61c of the internal gear 61. At the central portion of the external gear 63, a through-hole 63b is formed. On the surface side facing the internal gear 61 of the external gear 63, along the edge portion of an opening of the hole 63b, a cylindrical rising wall portion 63c is formed so as to protrude toward the internal gear 61. The outside diameter of the cylindrical rising wall portion 63c is set to be smaller than the inside diameter of the cylindrical rising wall portion 61e of the internal gear 61, and the cylindrical rising wall portion 63c of the external gear 63 serves as a cylindrical portion which is inserted into the cylindrical rising wall portion 61e of the internal gear 61 which is a circular hole portion.

At the outer surface of the external gear 63, four convex portions 63f are formed. The convex portions 63f are fit into four holes formed in a frame of the seat back 55. These fitting portions are fixed by a method such as welding or caulking, whereby the external gear 63 is attached to the seat back 55.

As shown in FIG. 5, in a state where the outer teeth 63a of the external gear 63 are engaged with the inner teeth 61c of the internal gear 61, the rotation axis (the center of the cylindrical rising wall portion 61e (a circular hole portion)) O1 of the internal gear 61 and the rotation axis (the center of the rising wall portion 63c (a cylindrical portion)) O2 of the external gear 63 are different. That is, the circular hole portion and the cylindrical portion are eccentric. Therefore, between the inner surface of the cylindrical rising wall portion 61e (the circular hole portion) of the internal gear 61 and the outer surface of the cylindrical rising wall portion 63c (the cylindrical portion) of the external gear 63, an eccentric annular space K is formed.

As shown in FIGS. 3 and 5, in the eccentric annular space K, a first wedge-shaped member 71 and a second wedge-shaped member 73 are provided. Further, in the eccentric space K, a driving ring 75 is provided so as to hold the first wedge-shaped member 71 and the second wedge-shaped member 73 in cooperation with the outer surface of the cylindrical rising wall portion 63c (the cylindrical portion) of the external gear 63. The first wedge-shaped member 71, the second wedge-shaped member 73, and the driving ring 75 are configured so as to be movable along the circumferential direction inside the eccentric annular space K.

The first wedge-shaped member 71 and the second wedge-shaped member 73 have a plane-symmetrical shape. The inner surface 71a of the first wedge-shaped member 71 and the inner surface 73a of the second wedge-shaped member 73 have shapes corresponding to the outer circumferential surface of the rising wall portion 63c of the external gear 63. The curvature of the outer surface 71b of the first wedge-shaped member 71 and the curvature of the outer surface 73b of the second wedge-shaped member 73 are larger than the curvatures of the inner surface 71a and the inner surface 73a. Also, the center of the curved surface of the outer surface 71b of the first wedge-shaped member 71 is different from that of the inner surface 71a. The thicknesses of the first wedge-shaped member 71 and the second wedge-shaped member 73 (dimensions in their radial directions) vary in wedge shapes. Specifically, the first wedge-shaped member 71 and the second wedge-shaped member 73 are formed in shapes whose thicknesses decrease toward wedge driving directions A and B.

The driving ring 75 is disposed on the outer side of the first wedge-shaped member 71 and the second wedge-shaped member 73 in the radial direction. At the inner surface 75a of the driving ring 75, an abutting surface (the details of which will be described below) is provided so as to abut on the outer surface 71b of the first wedge-shaped member 71 and the outer surface 73b of the second wedge-shaped member 73. Also, the shape of the outer surface 75b of the driving ring 75 is set to a shape corresponding to the inner surface of the cylindrical rising wall portion 61e (the circular hole portion) of the internal gear 61.

As shown in FIG. 5, the length of the driving ring 75 in the circumferential direction is set to be slightly longer than the length of the first wedge-shaped member 71 and the second wedge-shaped member 73 in the circumferential direction.

If the first wedge-shaped member 71 and the second wedge-shaped member 73 move in the wedge driving directions, the internal gear 61 and the external gear 63 relatively move in directions in which the inner teeth 61c and the outer teeth 63a are engaged.

The first wedge-shaped member 71 and the second wedge-shaped member 73 receive biasing forces in the wedge driving directions, from a spring 77 (an example of a pressing member) which tends to be elastically return in a diameter enlarging direction. This spring 77 has an annular portion 77a of one turn, and an end portion 77b and an end portion 77c rising from the annular portion 77a. The annular portion 77a is stored in a groove 61g formed along the opening of the cylindrical rising wall portion 61e (the circular hole portion) of the internal gear 61. The end portion 77b is locked in a groove portion 71c formed in a side end surface of the thick side of the first wedge-shaped member 71. The end portion 77c is locked in a groove portion 73c formed in a side end surface of the thick side of the second wedge-shaped member 73.

As shown in FIGS. 1, 2, 3, and 5, a lock releasing member 79 has a main body portion 79d, a fitting cylindrical portion 79e and a cam portion 79a. The fitting cylindrical portion 79e is connected to the main body portion 79d and is fit into the rising wall portion 63c of the external gear 63. The cam portion 79a is provided with a gap from the outer surface of the fitting cylindrical portion 79e and is disposed in the eccentric annular space K.

The lock releasing member 79 has a hole 79f coaxial with the rotation axis O2. Also, in the present embodiment, serration is applied to the inner surface of the hole 79f, and a drive shaft (not shown) is fit into the hole such that the drive shaft and the lock releasing member 79 rotate integrally.

The cam portion 79a has a first pressing portion 79b which faces a first end surface 75c which is one end surface of the driving ring 75 in the circumferential direction. Also, the cam portion 79a has a second pressing portion 79c which faces a second end surface 75d which is the other end surface of the driving ring 75 in the circumferential direction.

As shown in FIGS. 1, 2, and 3, a connection ring 81 makes the internal gear 61 and the external gear 63 unable to relatively move in an axial direction.

Next, the driving ring 75 will be described using FIGS. 1, 2, and 5.

At the inner surface 75a of the driving ring 75, two surfaces (a first abutting surface 75e and a second abutting surface 75f) are formed so as to abut on the outer surface 71b of the first wedge-shaped member 71. The first abutting surface 75e is a surface which has a flat surface shape and abuts on the outer surface 71b in the vicinity of the groove portion 71c of the first wedge-shaped member 71. The second abutting surface 75f is a surface which has a curved surface shape and abuts on the tip side of the first wedge-shaped member 71.

The first abutting surface 75e is formed such that, during locking, even if the driving ring 75 and the outer surface of the cylindrical rising wall portion 63c (the cylindrical portion) of the external gear 63 cooperatively hold the first wedge-shaped member 71 in the thickness direction, a force to move the first wedge-shaped member 71 in a direction in which the engagement of the inner teeth 61c of the internal gear 61 and the outer teeth 63a of the external gear 63 becomes shallower is not to be generated.

In the present embodiment, the first abutting surface 75e is formed such that, during locking, the driving ring 75 and the outer surface of the cylindrical rising wall portion 63c (the cylindrical portion) of the external gear 63 cooperatively hold the first wedge-shaped member 71 in the thickness direction, a force to move the first wedge-shaped member 71 in a direction in which the inner teeth 61c of the internal gear 61 and the outer teeth 63a of the external gear 63 are engaged is to be generated.

Further, the interval between the first abutting surface 75e of the driving ring 75 and the outer surface of the rising wall portion 63c of the external gear 63, which faces the first abutting surface with the first wedge-shaped member 71 interposed therebetween, gradually widens toward the opposite side to the wedge driving direction.

Similarly, at the inner surface 75a of the driving ring 75, two surfaces (a first abutting surface 75g and a second abutting surface 75h) are formed so as to abut on the outer surface 73b of the second wedge-shaped member 73. The first abutting surface 75g is a surface which has a flat surface shape and abuts on the outer surface 73b in the vicinity of the groove portion 73c of the second wedge-shaped member 73. The second abutting surface 75h is a surface formed in a curved surface shape on the tip side of the second wedge-shaped member 73.

The first abutting surface 75g is formed such that, during locking, even if the driving ring 75 and the outer surface of the cylindrical rising wall portion 63c (the cylindrical portion) of the external gear 63 cooperatively hold the second wedge-shaped member 73 in the thickness direction, a force to move the second wedge-shaped member 73 in a direction in which the engagement of the inner teeth 61c of the internal gear 61 and the outer teeth 63a of the external gear 63 becomes shallower is not generated. In the present embodiment, the first abutting surface 75g is formed such that, during locking, the driving ring 75 and the outer surface of the cylindrical rising wall portion 63c (the cylindrical portion) of the external gear 63 cooperatively hold the second wedge-shaped member 73 in the thickness direction, a force to move the second wedge-shaped member 73 in a direction in which the inner teeth 61c of the internal gear 61 and the outer teeth 63a of the external gear 63 are engaged is generated.

Further, the interval between the first abutting surface 75g of the driving ring 75 and the outer surface of the rising wall portion 63c of the external gear 63, which faces the first abutting surface with the second wedge-shaped member 73 interposed therebetween, gradually widens toward the opposite side to the wedge driving direction.

Figure 6:
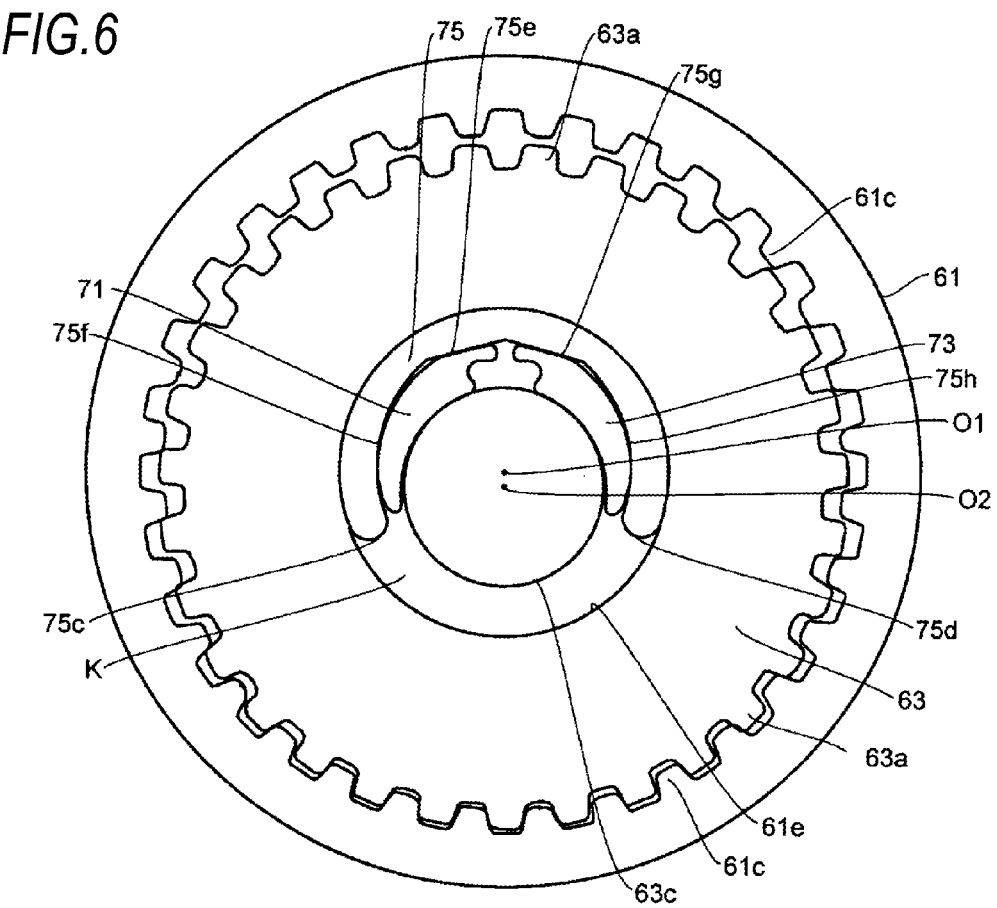
FIG. 6 is a view illustrating a state where a lock releasing member has operated from the locked state of FIG. 5, thereby having rotated a driving ring.
Figure 7:
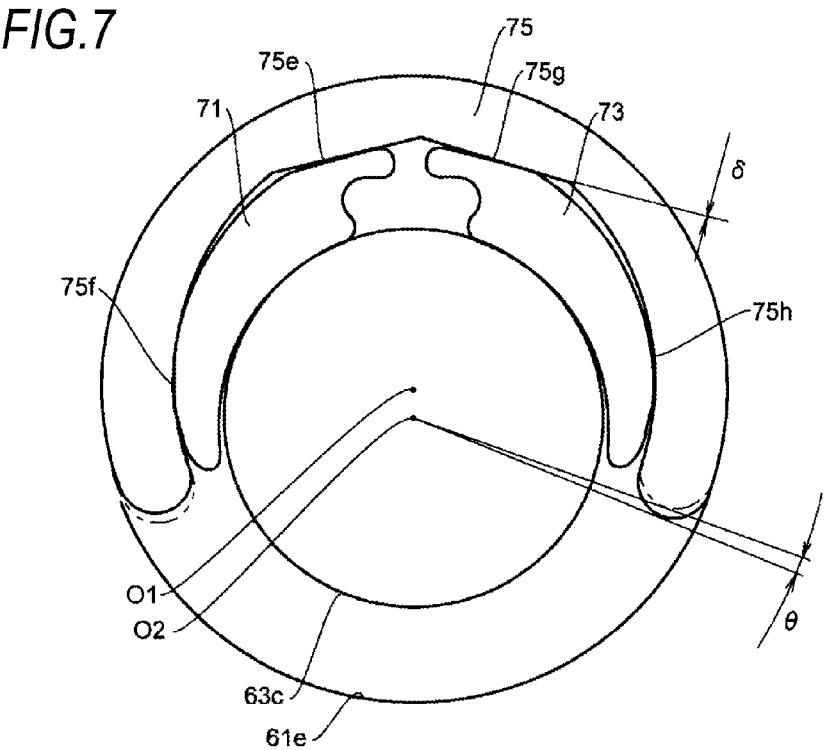
FIG. 7 is an enlarged view of the driving ring, a first wedge-shaped member, and a second wedge-shaped member of FIG. 6.
Figure 8:
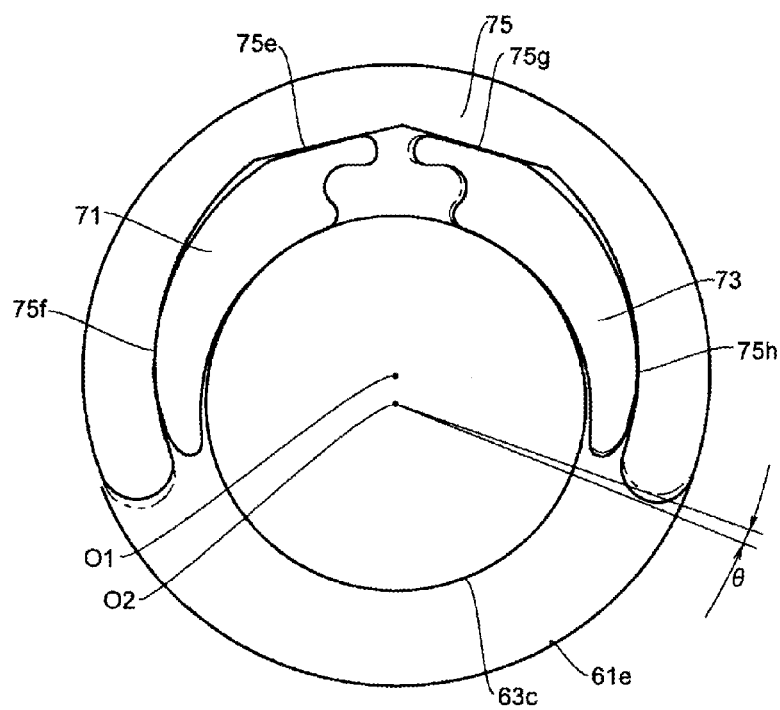
FIG. 8 is a view illustrating an operation from the state of FIG. 7.

Next, the operation of the reclining device 51 will be described using FIGS. 6 to 8. FIG. 6 is a view illustrating a state where the lock releasing member has operated from the locked state of FIG. 5, thereby having rotated the driving ring. FIG. 7 is an enlarged view of the driving ring, the first wedge-shaped member, and the second wedge-shaped member of FIG. 6. FIG. 8 is a view illustrating an operation from the state of FIG. 7.

As shown in FIG. 6, the first wedge-shaped member 71 and the second wedge-shaped member 73 receive biasing forces in directions in which they are separated from each other, from the spring 77. As a result, the first wedge-shaped member 71 and the second wedge-shaped member 73 press the outer surface of the rising wall portion 63c of the external gear 63, and the inner surface of the cylindrical rising wall portion 61e (the circular hole portion) of the internal gear 61 via the driving ring 75.

The first wedge-shaped member 71 and the second wedge-shaped member 73 each press the outer surface of the rising wall portion 63c of the external gear 63 and the inner surface of the cylindrical rising wall portion 61e (the circular hole portion) of the internal gear 61. As a result, the internal gear 61 and the external gear 63 are biased in directions to increase eccentricity between the rotation axes of them. Then, the inner teeth 61c of the internal gear 61 and the outer teeth 63a of the external gear 63 are deeply engaged, and the seat back 55 does not tilt. This state is referred to as a locked state.

In this locked state, there is a case where, due to the load of the seat back 55 or the load of a seated person on the seat back 55, the first wedge-shaped member 71 and the second wedge-shaped member 73 are strongly held by the outer surface of the rising wall portion 63c of the external gear 63 and the inner surface 75a of the driving ring 75. However, even if the first wedge-shaped member 71 and the second wedge-shaped member 73 are held in the thickness direction by the first abutting surface 75e and the first abutting surface 75g of the driving ring 75, a force to move the first wedge-shaped member 71 and the second wedge-shaped member 73 in a direction in which the engagement of the inner teeth 61c of the internal gear 61 and the outer teeth 63a of the external gear 63 becomes shallower is not generated. Therefore, at the seat back 55, clattering does not occur.

The effect of the driving ring 75 will be described in detail. It is considered a case where a seated person applies a load to recline the seat back 55 to the rear side to the seat back 55 in a state where the internal gear 61 and the external gear 63 are in the locked state.

In the present embodiment, the internal gear 61 is attached to the seat cushion 53, and the external gear 63 is attached to the seat back 55. Therefore, if a seated person applies a load to recline the seat back 55 to the rear side to the seat back 55, in FIG. 6, a moment is generated at the external gear 63 such that the upper portion of the external gear 63 moves to the rear side with respect to the internal gear 61. Then, the eccentric annular space K is deformed such that its right portion narrows and its left portion widens.

In the right portion of the eccentric annular space K, the outer circumferential surface of the second wedge-shaped member 73 receives a pressing force, as a reaction force against the force to deform the eccentric annular space K, from the second abutting surface 75h of the driving ring 75. The curvature of the outer circumferential surface of the second wedge-shaped member 73 increases toward the wedge driving direction. Therefore, the pressing force which the outer circumferential surface of the second wedge-shaped member 73 receives from the second abutting surface 75h of the driving ring 75 is considered as being decomposed into a component force, which is directed to the center O2, and a component force, which intersects with that component force and is directed to the opposite side to the wedge driving direction. Due to the component force, which is directed to the center O2, between the second wedge-shaped member 73 and both the driving ring 75 and the rising wall portion 63c of the external gear 63, a frictional force is generated.

In a case where the first abutting surface 75g is not formed at the driving ring 75, if the frictional force is smaller than the component force which is directed to the opposite side to the wedge driving direction, the second wedge-shaped member 73 moves to the opposite side to the wedge driving direction. Then, the locked state of the internal gear 61 and the external gear 63 loosens, and the internal gear 61 and the external gear 63 relatively rotate.

Also, if the seated person relieves the load on the seat back 55, the second wedge-shaped member 73 returns to the original position by the spring 77. Therefore, the internal gear 61 and the external gear 63 become the locked state again.

Since the second wedge-shaped member 73 operates as described above whenever the seated person applies a load to the seat back 55, clattering occurs at the seat back 55.

So, according to the reclining device 51 of the present embodiment, the first abutting surface 75g is formed at the driving ring 75. The first abutting surface 75g is formed such that, in a case where the internal gear 61 and the external gear 63 are in the locked state, a force to move the second wedge-shaped member 73 in a direction in which the engagement of the inner teeth 61c of the internal gear 61 and the outer teeth 63a of the external gear 63 becomes deeper can be generated.

Specifically, in the present embodiment, the first abutting surface 75g is provided on the opposite side to a direction in which a wedge is driven from the second abutting surface 75h. The second abutting surface 75h is formed of a curved surface having a predetermined curvature. In contrast with this, the first abutting surface 75g is curved with respect to the second abutting surface 75h so as to be connected to the second abutting surface 75h at an angle smaller than 180 degrees.

Therefore, if a load acts on the seat back 55 in the locked state, the first abutting surface 75g of the driving ring 75 also applies a reaction force against the force to deform the eccentric annular space K, to the outer circumferential surface of the second wedge-shaped member 73. The first abutting surface 75g is formed such that the reaction force which is applied to the outer circumferential surface of the second wedge-shaped member 73 by the first abutting surface 75g, is decomposed into a component force, which is directed to the center O2 and a component force, which intersects with that component force and is directed to the wedge driving direction. Since the first abutting surface 75g can apply a force to the second wedge-shaped member 73 in the wedge driving direction even if a load acts on the seat back 55 in the locked state, it is easy to maintain the locked state. Therefore, even if the seated person applies a load to the seat back 55, clattering is difficult to occur at the seat back 55.

Also, in case where the component force, which is generated in the wedge driving direction by the first abutting surface 75g, is set to be larger than the component force, which is generated toward the opposite side to the wedge driving direction by the second abutting surface 75h, it is possible to provide the reclining device 51 in which clattering does not occur. Therefore, this configuration is preferable. That is, it is preferable to form the first abutting surface 75g such that, in a case where the internal gear 61 and the external gear 63 are in the locked state, the driving ring 75 applies a force to move the second wedge-shaped member 73 in the wedge driving direction, as a whole, to the second wedge-shaped member 73.

It is preferable that the first abutting surface 75g is formed in a shape in which an interval from the rising wall portion 63c (an example of one surface of the inner surface of the circular hole portion and the outer surface of the cylindrical portion) gradually widens toward the opposite side to the wedge driving direction.

It is preferable that the first abutting surface 75g is provided at an area of the inner circumferential surface of the driving ring 75 positioned on the opposite side to the wedge driving direction. Alternatively, it is preferable that the first abutting surface 75g should be inclined with respect to the second abutting surface 75h. According to this configuration, it is easy for the first abutting surface 75g to apply a component force to the second wedge-shaped member 73 in the wedge driving direction.

Also, in the above described embodiment, the first abutting surface 75g has been described as a flat surface. However, the first abutting surface 75g may be a curved surface. The first abutting surface 75g may be configured by a plurality of flat surfaces having normal components different from one another, or by different curved surfaces.

Also, in the above description, the relation between the first abutting surface 75g of the driving ring 75 and the second wedge-shaped member 73 has been described. However, with respect to the relation between the first abutting surface 75e of the driving ring 75 and the first wedge-shaped member 71, the above description is the same. That is, the first abutting surface 75e is formed such that, in a case where the internal gear 61 and the external gear 63 are in the locked state, a force to move the first wedge-shaped member 71 in a direction in which the engagement of the inner teeth 61c of the internal gear 61 and the outer teeth 63a of the external gear 63 becomes deeper can be generated. Therefore, even if a load to recline the seat back 55 toward the front side is applied in a case where the internal gear 61 and the external gear 63 are in the locked state, clattering is difficult to occur.

(Unlocked State)

As shown in FIGS. 6 and 7, in the locked state, if an operation button or an operation panel is operated such that the drive shaft (not shown) is rotated in a right direction or a left direction, the lock releasing member 79 rotates in a right direction or a left direction. As an example, in a case where the lock releasing member 79 (see FIG. 3) rotates θ degrees counterclockwise as seen from an arrow C direction in FIG. 1, the second pressing portion 79c of the cam portion 79a presses the second end surface 75d which is the other end surface of the driving ring 75, and the driving ring 75 rotates to the position of an alternate long and two short dashes line.

Then, as shown in FIG. 7, between the first abutting surface 75g of the driving ring 75 and the second wedge-shaped member 73, a gap δ is generated. As a result, a component force to be applied from the first abutting surface 75g to the second wedge-shaped member 73 is not generated. Therefore, as shown by the alternate long and two short dashes line, the second wedge-shaped member 73 moves in the drawing direction. In response to the movement of the second wedge-shaped member 73, the pressing force by which the outer surface of the rising wall portion 63c of the external gear 63 of the second wedge-shaped member 73 is pressed to the inner surface of the cylindrical rising wall portion 61e (the circular hole portion) of the internal gear 61 via the driving ring 75 decreases, and the engagement of the inner teeth 61c of the internal gear 61 and the outer teeth 63a of the external gear 63 becomes shallower, and the seat back 55 becomes able to tilt.

When the second wedge-shaped member 73 starts moving, the first wedge-shaped member 71 is still due to friction between the outer surface of the rising wall portion 63c of the external gear 63 and both the first abutting surface 75e and the second abutting surface 75f of the driving ring 75. However, as shown in FIG. 8, if the second wedge-shaped member 73 moves in the drawing direction, the first wedge-shaped member 71 quickly moves in the direction to drive the wedge into the eccentric annular space K by the elastic repulsion force of the spring 77.

With repeating this operation, a eccentricity state between the internal gear 61 and the external gear 63 is maintained, and the engagement portion varies, whereby the seat back 55 tilts.

Also, this is the same even in a case where the lock releasing member 79 rotates clockwise as seen from the arrow C direction in FIG. 1.

According to this configuration, there are the following advantages.

(1) The first abutting surfaces 75e and 75g are formed at the driving ring 75 such that, when the internal gear 61 and the external gear 63 are in the locked state, a force to move the first wedge-shaped member 71 and the second wedge-shaped member 73 in the direction in which the engagement of the inner teeth 61c of the internal gear 61 and the outer teeth 63a of the external gear 63 becomes deeper can be generated. As a result, clattering is difficult to occur at the seat back 55.

(2) The first abutting surfaces 75e and the 75g are flat surfaces, and the intervals between the first abutting surfaces 75e and the 75g and the rising wall portion 63c (an example of the outer surface of the cylindrical portion) of the external gear 63 or the rising wall portion 61e (an example of the inner surface of the circular hole portion) of the internal gear 61, which faces the first abutting surfaces 75e and the 75g with the first wedge-shaped member 71 and the second wedge-shaped member 73 interposed therebetween, gradually widen toward the direction opposite to the wedge driving direction.

Therefore, it is possible to absorb variations in the component accuracy and assembling accuracy of the first wedge-shaped member 71, the second wedge-shaped member 73, the internal gear 61, the external gear 63, and the driving ring 75 by allowing the first wedge-shaped member 71 and the second wedge-shaped member 73 to move in the circumferential direction.

(3) The driving ring 75 is disposed on the outer side of the first wedge-shaped member 71 and the second wedge-shaped member 73 in the eccentric annular space K. That is, since the driving ring 75 is at a position separated from the rotation axis of the lock releasing member 79 on which a lock releasing operation force applied, it is possible to move the driving ring 75 with a small operation force.

The present invention is not limited to the above described embodiment. For example, the driving ring may be disposed on the inner side of the first wedge-shaped member and the second wedge-shaped member.

Also, an example in which the internal gear is provided on the seat cushion side and the external gear is provided on the seat back side has been described in the above described embodiment. However, the external gear may be provided on the seat cushion side, and the internal gear may be provided on the seat back side.

Further, a cylindrical portion may be formed at the internal gear, and a circular hole portion may be formed at the external gear.

Also, the invention of this application is not limited to configurations described in the embodiment and modifications of the embodiment, and configurations obtained by making various other modifications can be used.

This application claims priority from Japanese Patent Application (Application No. 2012-234428) filed with the Japan Patent Office on Oct. 24, 2012, the entire content of which is hereby incorporated by reference.

INDUSTRIAL APPLICABILITY

According to the present invention, a reclining device in which clattering is difficult to occur is provided.

DESCRIPTION OF REFERENCE NUMERALS AND SYMBOLS

61 INTERNAL GEAR
61c INNER TEETH
63 EXTERNAL GEAR
63a OUTER TEETH
71 FIRST WEDGE-SHAPED MEMBER
73 SECOND WEDGE-SHAPED MEMBER
75 DRIVING RING

The invention claimed is:

1. A reclining device comprising:
an external gear that has outer teeth formed at an outer surface and is provided on a member of one of a seat cushion side and a seat back side;
an internal gear that has inner teeth engaged with the outer teeth of the external gear and have a larger number of teeth than the outer teeth and is provided on a member of the other of the seat cushion side and the seat back side;
a cylindrical portion that has one of a rotation axis of the external gear and a rotation axis of the internal gear as a center and is provided at one of the external gear and the internal gear;
a circular hole portion that has the other of the rotation axis of the external gear and the rotation axis of the internal gear as a center and is provided at the other of the external gear and the internal gear and that forms an annular space between the circular hole portion and the cylindrical portion;
a first wedge-shaped member and a second wedge-shaped member that have substantially arc-shapes and have shapes tapered toward wedge driving directions and that are provided so as to be movable along a circumferential direction in the annular space;
a pressing member that is able to press the first wedge-shaped member and the second wedge-shaped member in a direction in which the inner teeth of the internal gear and the outer teeth of the external gear are engaged, thereby forming a locked state; and
a driving ring that is provided to be movable between the inner surface of the circular hole portion and the outer surface of the cylindrical portion and has an abutting portion which abuts on the first wedge-shaped member and the second wedge-shaped member,
wherein the abutting portion of the driving ring is formed to be able to generate a force to move the first wedge-shaped member and the second wedge-shaped member in a direction, in which engagement of the inner teeth of the internal gear and the outer teeth of the external gear becomes deeper, when the internal gear and the external gear are in the locked state,
wherein the abutting portion of the driving ring is formed as an abutting surface, and
wherein an interval between the abutting portion of the driving ring and one of the inner surface of the circular hole portion and the outer surface of the cylindrical portion gradually widens toward a direction opposite to the wedge driving direction.

2. The reclining device according to claim 1, wherein the abutting portion is formed such that, when the internal gear and the external gear are in the locked state, the driving ring applies, to the second wedge-shaped member, a force to move the second wedge-shaped member in the wedge driving direction.

3. The reclining device according to claim 1, wherein the driving ring is disposed on an outer side of the first wedge-shaped member and the second wedge-shaped member in a radial direction, in the annular space.

* * * * *